United States Patent [19]
DeVille

[11] Patent Number: 5,537,513
[45] Date of Patent: Jul. 16, 1996

[54] NEURAL PROCESSOR WHICH CAN CALCULATE A NORM OR A DISTANCE

[75] Inventor: Yannick DeVille, Villecresnes, France

[73] Assignee: U.S. Philips Corporation, New York, N.Y.

[21] Appl. No.: 461,474

[22] Filed: Jun. 5, 1995

Related U.S. Application Data

[62] Division of Ser. No. 363,556, Dec. 21, 1994, which is a continuation of Ser. No. 55,444, Apr. 29, 1993, abandoned.

[30] Foreign Application Priority Data

Apr. 29, 1992 [FR] France ................. 92 05283

[51] Int. Cl.$^6$ .................................................. G06F 15/18
[52] U.S. Cl. ....................... 395/27; 395/21; 395/26
[58] Field of Search ....................... 395/20–25, 26–27; 382/155–159

[56] References Cited

U.S. PATENT DOCUMENTS

| | | | |
|---|---|---|---|
| 4,941,122 | 7/1990 | Weideman | 364/80 |
| 4,949,296 | 8/1990 | Malinowski | 364/752 |
| 4,994,982 | 2/1991 | Duranton et al. | 364/513 |
| 5,128,891 | 7/1992 | Lynch et al. | 364/767 |
| 5,131,072 | 7/1992 | Yoshizawa et al. | 395/24 |
| 5,151,874 | 9/1992 | Jeong et al. | 364/752 |
| 5,170,463 | 12/1992 | Fujimoto et al. | 395/11 |

FOREIGN PATENT DOCUMENTS 2236608 4/1991 United Kingdom ............ G06F 15/18

OTHER PUBLICATIONS

"An Introduction to Computing with Neural–Nets", by R. P. Lippmann, IEEE ASSP Magazine, Apr. 1987, pp. 4–22.
"Neural Computation of Arithmetic Functions", by K. Siu et al, Proc. of the IEEE, vol. 78, No. 10, Oct. 1990, pp. 1669–1675.
"Quadratic Function Nodes: Use, Structure and Training", by D. J. Volper et al, Neural Networks, vol. 3, 1990, pp. 93–107.
"On the Training of Radial Basis Function Classifiers", by M. T. Musavi et al, Neural Networks, vol. 5, 1992, pp. 595–603.
"Learning on VLSI: A General–Purpose Digital Neurochip", by M. Duranton et al, Philips J. Res. 45, 1990, pp. 1–17.
"Phoneme Classification Experiments Using Radial Basis Functions", by S. Renals et al, Proc. Int. Joint Conference on Neural Network, Washington, D.C. 1989, pp. I-461-I-467.
"Layered Neural Nets for Pattern Recognition", by B. Widrow et al, IEEE Trans. on Acoustics, Speech, and Signal Processing, vol. 36, No. 7, Jul. 1988, pp. 1109–1118.

Primary Examiner—David K. Moore
Assistant Examiner—Tariq Hafiz
Attorney, Agent, or Firm—Debra K. Stephens; Anne E. Barschall

[57] ABSTRACT

A neural processor, comprising neural calculation apparatus (30, NQ, RQ) which extracts a root Q of a quantity X, said root constituting either a norm of a data or a distance between data. The calculation apparatus calculates (30) by iteration a series of contributions $\Delta Q_i$ which are used (NQ, RQ) to update a partial root QP which becomes the root Q at the end of calculation. The calculation can be performed on an arbitrary arithmetic base which determines the number of neurons utilized and also the accuracy of calculation. It is also possible to execute the calculation of a partial remainder (NR, RR). Several programming modes are presented.

3 Claims, 5 Drawing Sheets

FIG. 2B $Z = C_1 \cdot Z_1 \cdot Z'_1 + C_2 \cdot Z_2 \cdot Z'_2$

NEURAL PROCESSOR WHICH CAN CALCULATE A NORM OR A DISTANCE

This is a division of application Ser. No. 08/363,556, filed on Dec. 21, 1994, currently pending, which is a continuation of application Ser. No. 08/055,444, filed Apr. 29, 1993, now abandoned.

FIELD OF THE INVENTION

The invention relates to a neural processor, comprising neural calculation means which extract a root of a quantity X, which root constitutes either a norm of a data or a distance between data. Such calculation can be used for classification problems, notably for the recognition of shapes, or characters, the processing of speech signals, image processing, compression of information, and others.

BACKGROUND TO THE INVENTION

Information concerning various types of neural networks can be found, for example in the article by R. P. LIPPMANN "An introduction to computing with neural nets", IEEE ASSP Magazine, April 1987, pp. 4 to 22 which is incorporated herein by reference.

For implementation of some of the above processes it may be necessary to calculate distances between data represented by vectors or to calculate vector norms. This is the case, for example in order to implement given learning algorithms. It appeared advantageous to let the neural processor itself calculate such norm or distance. Such calculation could be executed even independently from its usage in any of the cited processes.

In this respect reference is made to an article "Neural Computation of arithmetic functions" by K. Y. SIV and J. BRUCK. Proc. IEEE, Vol. 78, No. 10, October 1990, pp. 1669–1675 which is incorporated herein by reference.

The article mentions the interest in the calculation of square roots by means of a neural network, but nothing is said about how the neural network is to be trained.

The following additional background material is incorporated herein by reference:

1. U.S. Pat. No. 4,994,982, which shows the structure of a prior art neuron;
2. British Pat. No. GB 2,236,608 A, which also shows the structure of a prior art neuron;
3. S. Renals et al., "Phoneme Classification Experiments Using Radial Basis Functions", Proceedings Internation Joint Conference on Neural Networks, pp. I. 461-i. 467, IEEE, Washington D.C., June 1989, which shows an application area in which the present invention would be useful.
4. M. Duranton et al., "Learning on VLSI: A General Purpose Neurochip", Philips J. Res. 45, 1–17, 1990 which shows a prior art neurochip and sicsusses fields of application.

SUMMARY OF THE INVENTION

Now, amongst other things, it is an object of the invention to provide a neural processor which can be trained so as to calculate norms or distances by performing a calculation of the root Q. It is desirable to utilize only a minimum amount of hardware means operating with a reduced number of calculation cycles. It should be easy to reconfigure the calculation means for adaptation to various input data and the accuracy of calculation must be predetermined. It is desirable that the foregoing is achieved by modifying the architecture of the neural processor as little as possible.

Accordingly, according to a first aspect the invention provides a neural processor for which said calculation means are trained to activate:

at least one neuron which iteratively calculates a series of contributions $\Delta Q_i = q_i . B^i$ which together form an expression of the root Q on an arithmetic base B, and at least one neuron which iteratively updates a partial root QP by summing said contributions $\Delta Q_i$ in order to produce the root Q.

Thus, it is attractively possible to choose the dimension of the base B, and hence the number of contributions $\Delta Q_i$ to be calculated and also the number of neurons, in order to obtain a higher or lower execution speed for the calculation of the root Q. Thus, a choice can be made either for a high speed using multiple hardware means or for a reduced amount of hardware means with a reduced execution speed. The operation by iteration enables a substantial reduction of the hardware required for the calculations.

A root Q can be expressed on an arbitrary base B as:

$$Q = \sum_{i=-m}^{n} q_i \cdot B^i = q_n \cdot B^n + q_{n-1} \cdot B^{n-1} \ldots + q_i \cdot B^i \ldots +$$

$$q_1 \cdot B^1 + q_0 \cdot B^0 + q_{-1} \cdot B^{-1} + \ldots q_{-m} \cdot B^{-m}$$

The choice of the base and of the value of m enables the accuracy of the calculation to be predetermined. In order to obtain Q with an accuracy of one unit, it suffices to use only the terms from $q_n . B^n$ to $q_o . B^o$. The value Q is then the integer part of the exact root of X. The data X must be positive.

In accordance with the invention, all terms $q_i . B^i$, $-m \leq i \leq n$ are iteratively determined, starting with the most-significant term $q_n . B^n$. These terms are determined on the base B which may be arbitrary. The choice of the base B determines the manner in which the architecture of the neural processor is implemented. The dimension of the base B being chosen for the calculation of each term $q_i . B^i$ each value $q_i$ is determined, and to this end several terms $j.B^i$ are determined for which the values j enclose the value $q_i$ to be determined. For a base of the dimension B, the values of j are between 0 and B-1. Because the value 0 does not require calculation, these terms are determined for $1 \leq j \leq B-1$. The operation of the neural processor will thus require either at the most B-1 neurons or groups of neurons operating in parallel or at least one neuron successively operating for B-1 calculation steps. Intermediate situations may also be used. A high speed of execution is obtained, for example by parallel operation of B-1 neurons or groups of neurons with a large dimension of the base B. A slower speed of execution can be obtained by operation of a limited number of neurons in several consecutive steps or by choosing a smaller dimension for the base B.

A neural processor is in principle formed by memories storing neuron states $V_i$, memories storing synaptic coefficients $C_{ij}$, units for calculating weighted sums $\Sigma C_{ij} . V_i$, and units for applying non-linear transfer functions to said weighted sums in order to produce neuron states $V_j$. The latter constitute the results of the operations executed, that is to say results in the form of norms or distances within the context of the invention.

In accordance with the invention, said memories and said units are trained by initial values, given values being permanent values and other values being regularly updated in order to execute the root calculations. During each calculation cycle a partial root QP and possibly a partial remainder RP are calculated, said values being updated. At the end of the calculation, the last partial root QP constitutes the final root Q and RP constitutes the final remainder. During each cycle, the results obtained are thus recycled for the next cycle.

In one implementation only the partial root QP is used, without calculation of the partial remainder RP. In this case, the partial root QP initially being zero, for the calculation of a root of degree d, said calculation means are trained to:

a—calculate a plurality of quantities $$SD_j = X - (QP_{i+1} + j \cdot B^i)^d \quad (1)$$

said plurality resulting from a number of B-1 operations performed by at least one neuron for j varying from 1 to B-1, i being an integer number initially equal to a predetermined maximum number.

b—determine a value $j=q_i$ which verifies:
$\text{sgn}(SD_j) \neq \text{sgn}(SD_{j+1})$
where $SD_a \geq 0$, $SD_B < 0$ and $\text{sign}(0) = +1$ c—determine a contribution $\Delta Q_i = q_i \cdot B^i$ d—determine a new partial root so that:
$QP_i = QP_{i+1} + \Delta Q_i$ e—decrement i so as to determine the root Q by iteration of the preceding operations until there is obtained a minimum value i which defines a predetermined accuracy for Q.

In another implementation, the partial root as well as the partial remainder RP are used. In that case the calculation means are trained to calculate also a partial remainder $RP_i = X - (QP_i)^d$, the partial remainder, initially being equal to X, being updated by iteration so that:

$$RP_i = RP_{i+1} + (QP_{i+1})^d - (QP_{i+1} + \Delta Q_i)^d \quad (2)$$

$$\text{or } RP_i = RP_{i+1} + (QP_i - \Delta Q_i)^d - (QP_i)^d \quad (3)$$

In another implementation, the partial remainder is also used to calculate the quantities $SD_j$ which are then written as:

$$SD_j = RP_{i+1} + (QP_{i+1})^d - (QP_{i+1} + j \cdot B^i)^d \quad (4)$$

The B-1 operations of the step a can be performed by B-1 neurons or groups of neurons trained to operate in parallel. The B-1 operations can also be performed by a single neuron or group of neurons operating in B-1 successive calculation steps if the speed at which the result is obtained is not important.

The B-1 operations can also be distributed among groups of neurons which execute a partly parallel and a partly iterative process.

Depending on the dimension chosen for the base B, the calculations of the contributions $\Delta Q_i$ can be realised by at least a single neuron which performs either the steps a, b and c or the steps a, b with at least a single other neuron for cumulation of the successive contributions $\Delta Q_i$ during either the step d or the steps c and d. For the calculation of a square root (d=2), the equations (1), (2), (3) and (4) become:

$$SD_j = X - (QP_{i+1} + j \cdot B^i)^2 \quad (1')$$

$$RP_i = RP_{i+1} - \Delta Q_i (2 \; QP_{i+1} + \Delta Q_i) \quad (2')$$

$$RP_i = RP_{i+1} - \Delta Q_i (2 \; QP_i - \Delta Q_i) \quad (3')$$

$$SD_j = RP_{i+1} - j \cdot B^i (2 \; QP_{i+1} + j \cdot B^i) \quad (4')$$

Using a base of dimension 2, the calculation of the root can be performed using only two neurons.

The operations for calculating the norm or the distance as described above generally occur at the end of given neural processing steps relating to resolving and/or learning phases. Therefore, neurons of the neural processor can be used to execute such a calculation at a given instant and to execute steps of the actual neural process at another instant. Therefore, it is not necessary that the neural processor comprises neurons specifically dedicated to the operations for calculating the root. However, this situation is nevertheless possible, the neural processor then being used exclusively for calculations of the roots.

Moreover, it may be that the quantity X wherefrom a root is to be extracted is not supplied directly to the neural processor but indirectly in the form of vector components. In that case the neural processor should first calculate the quantity or quantities X on the basis of said vector components. The extremities of said vector may also be represented by two vectors. The distances between these two vectors can thus be calculated. In the case of a calculation of a norm, the neural processor is also trained to calculate said quantity X so that it is equal to the sum of powers of the degree d of each of said components.

In the case of the calculation of the distance, the neural processor is also trained to calculate said quantity X, for vectors taken two by two so that it is equal to the sum of the powers of the degree d of the differences of said components of the same order.

The various aspects of the invention and other aspects will become apparent from and will be elucidated with reference to the embodiments described hereinafter.

BRIEF DESCRIPTION OF THE DRAWINGS

The invention will be described in detail hereinafter with reference to the accompanying drawings. Therein:

FIGS 2(a-d) show a diagrammatic representation A of a neuron without a means for applying a non-linear function, a diagrammatic representation B of a neuron provided with a means for applying a non-linear function F, a diagrammatic representation C which is analogous to A and comprises supplementary inputs $Z'_1$ and $Z'_2$, and a curve D which represents a non-linear function F.

DESCRIPTION OF EMBODIMENTS

Figure 1:
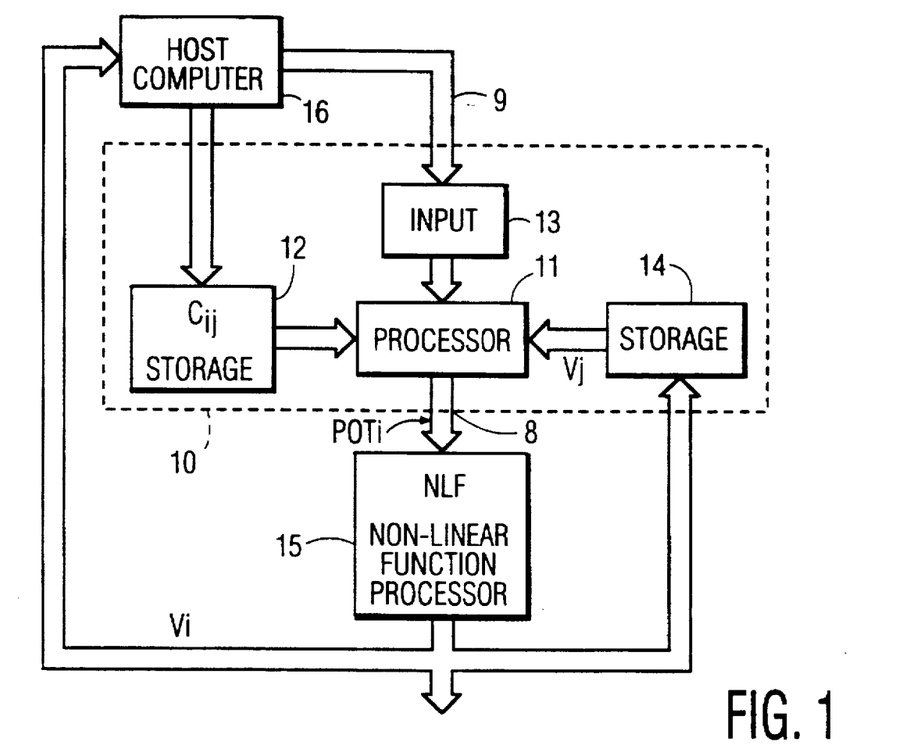
FIG. 1 shows a diagram of a known architecture of a neural processor.

FIG. 1 shows a simplified diagram of a known architecture of a neural processor 10. Input means INP 13 (for example, input registers or input terminals) apply input data 9 to a processing unit 11 which also receives synaptic coefficients $C_{ij}$ stored in storage means 12. Any synaptic coefficient $C_{ij}$ characterizes the weight of the synapsis connecting a source neuron j to a destination neuron i. The processing unit 11 also receives neuron states stored in storage means 14. When a neuron operates as a source neuron, its state is denoted as $V_j$ and when it operates as a destination neuron, its state is denoted by the reference $V_i$. For each destination neuron, the processing unit 11 executes calculations:

$$POT_i = \sum_j C_{ij} \cdot V_j$$

The processing unit 11 forms the sum for all source neurons of the index j and outputs (connection 8) the neural potential $POT_i$ of the destination neuron i. This neural potential $POT_i$ is subjected to a non-linear function NLF 15 which produces the new neuron state $V_i$ of the destination neuron i. This new state $V_i$ is used to update the storage means 14, and the process continues for other neurons. The means 15 for applying the non-linear function NLF are shown to be external of the neural processor 10. FIG. 1 merely illustrates the architecture, because these application means 15 may also be ganged within the neural processor 10. They may also affect only a part of the neurons. A host computer 16 controls the assembly of mechanisms put into operation. It supplies the synaptic coefficients Cii and the input data 9 and receives output data in the form of neuron states $V_i$ in order to perform the calculations of the roots. For the sake of simplicity, other members have been omitted, such as control means and learning means.

In principle, a neural processor supplies data and receives data in the form of neuron states. This data relates to physical quantities. A physical quantity is transformed into electric signals representing, for example a number which enumerates a population of objects, or representing, for example a luminous quantity which determines a luminance or a frequency determining a periodicity of a phenomenon, or any other physical quantity. For example, the neural processor may be used to sort, in a group of elements, the elements of different categories A, B, C . . . . The neural processor then enumerates the number of elements relating to each category A, B, C, . . . . Calculated neuron states enable enumeration of these different categories. The data is not always proportioned so that it can be introduced as such into the neural processor. In the course of given operations, for example for learning, it may be necessary, to express the input data with respect to a norm in order to continue the processing. The invention aims to determine this norm. It is then possible for example to normalize all data by ensuring that the maximum data does not exceed this norm. It may also concern data originating from outside the neural processor.

Figure 2A:
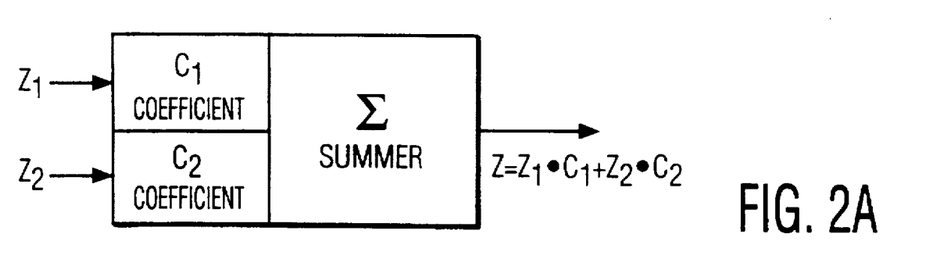
Figure 2B:
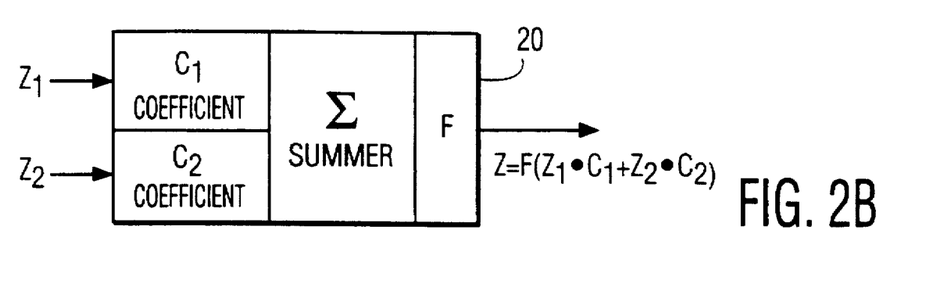
Figure 2C:
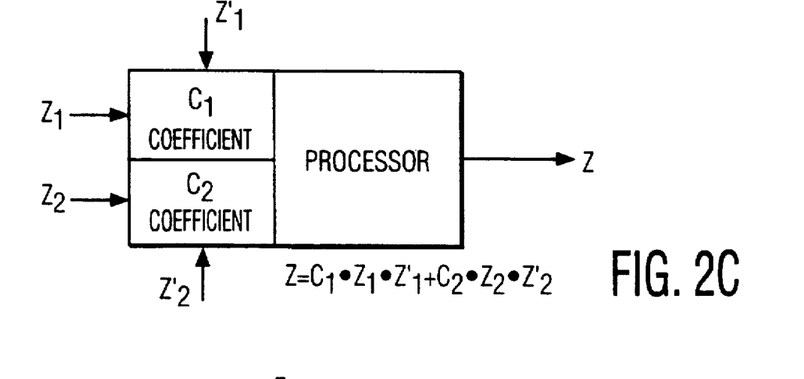
Figure 2D:
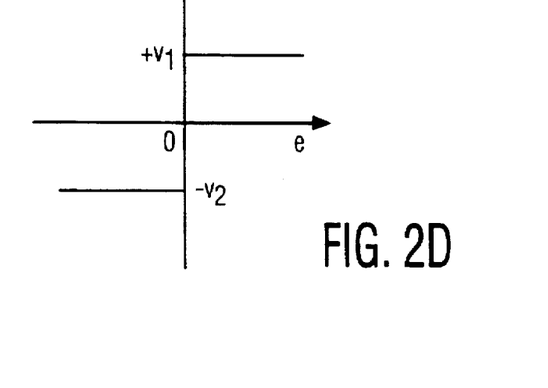

The invention utilizes three types of neurons. A first type of neuron (FIG. 2-A) operates as a summing device and does not include means for applying a non-linear function F. It essentially comprises means for storing two synaptic coefficients $C_1$, $C_2$ which are multiplied by input values $Z_1$ and $Z_2$, respectively, in order to form products $Z_1 \cdot C_1$ and $Z_2 \cdot C_2$. These products are added in a summing device Σ which outputs an output value Z so that $$Z = Z_1.C_1 + Z_2.C_2.$$

A second type of neuron (FIG. 2-B) operates as a test device and comprises the same elements as the first type of neuron, but also means 20 (for example, a comparator) for applying a non-linear function F. The output of the neuron thus supplies a value Z so that:

$$Z = F(Z_1.C_1 + Z_2.C_2).$$

A third type of neuron (FIG. 2-C) comprises a double number of inputs with respect to that shown in FIG. 2-A. Thus, with a coefficient, for example $C_1$, there are associated two inputs $Z_1$ and $Z'_1$. Products such as $C_1.Z_1.Z'_1$ can thus be calculated. Using two pairs of inputs, the neuron shown in FIG. 2-C enables determination of:

$$Z = C_1.Z_1.Z'_1 + C_2.Z_2.Z'_2.$$

The summing device may be followed by a device for applying a non-linear function as in FIG. 2-B. The number of inputs or the number of pairs of inputs $(Z_1, Z'_1)$, $(Z_2, Z'_2)$ may be greater than two.

The non-linear function F is represented in FIG. 2-D. The means 20 (FIG. 2-B) comprise an input e which receives the output signal of the summing device Σ, said signal being compared with a value zero. When said input e receives on the one hand negative signals or on the other hand positive signals, the means 20 produce an output signal amounting to $-v_2$ or $+v_1$, respectively. In most embodiments to be described hereinafter, the values $+v_1/-v_2$ can be equal to 1/0, j/0, $B^i/0$.

First implementation with d=2

Figure 3:
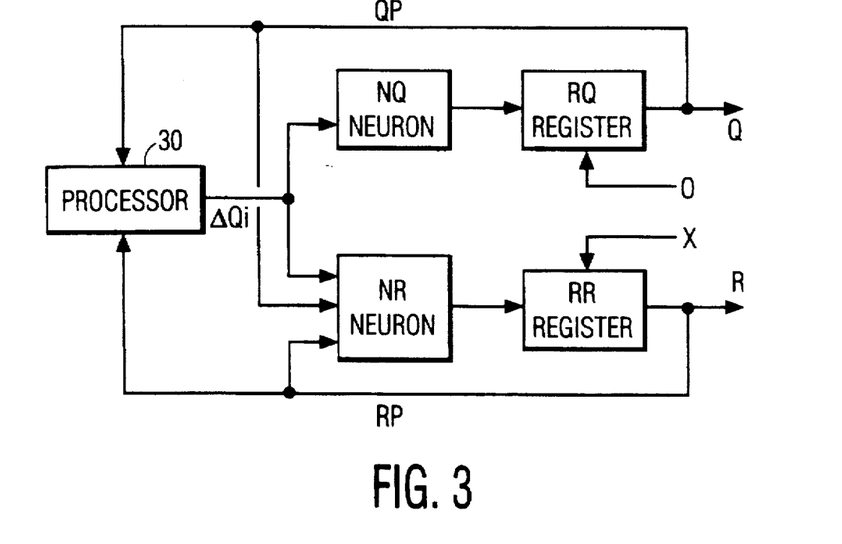
FIG. 3 shows a diagram of a first implementation of calculation means for calculating a root and a remainder in accordance with the invention.

FIG. 3 diagrammatically shows an implementation of calculation means programmed to calculate a root of degree d=2. Means 30 successively calculate the contributions $\Delta Q_i = q_i.B^i$ on the basis of a partial remainder RP and a partial quotient QP. Initially QP=0 and RP=X. Each contribution $\Delta Q_i$ serves to update RP and QP according to:

$$QP_i = QP_{i+1} + \Delta Q_i$$

$$\text{and } RP_i = RP_{i+1} - \Delta Q_i(2.QP_{i+1} + \Delta Q_i)$$

where i is an integer which decreases from a maximum value $i_{max}$. These updating operations utilize a neuron NQ of the first type and a neuron NR of the first or the third type comprising three inputs. Each neuron is coupled end-around in order to operate as an accumulator. This loop-type operation makes it necessary for each neuron NQ, NR to be followed by a register RQ, RR, respectively, which stores the result during an elementary calculation cycle. The register RQ is initialized to zero, the register RR is initialized to X and the synaptic coefficients of the two neurons are learned The values of the parameters $Z_1$, $C_1$, $Z_2$, $C_2$ are given in Table IA for the neuron NQ.

TABLE IA

|    | $Z_1$ | $C_1$ | $Z_2$ | $C_2$ |
|----|-------|-------|-------|-------|
| NQ | $QP_{i+1}$ | 1 | $\Delta Q_i$ | 1 |

For the neuron NR, use can be made of:

either a neuron of the first type, having a third input $Z_3$ and a third coefficient $C_3$, which neuron is trained in accordance with Table IB (FIG. 3):

TABLE IB

|      | $Z_1$ | $C_1$ | $Z_2$ | $C_2$ | $Z_3$ | $C_3$ |
|------|-------|-------|-------|-------|-------|-------|
| 1 NR | $RP_{i+1}$ | 1 | $\Delta Q_i$ | $-2QP_{i+1}$ | $\Delta Q_i$ | $-\Delta Q_i$ |
|      | $RP_{i+1}$ | 1 | $QP_{i+1}$ | $-2\Delta Q_i$ | $\Delta Q_i$ | $-\Delta Q_i$ | or a neuron of the third type (with 3 inputs) which is trained in accordance with Table IC

TABLE IC

|    | $Z_1$ | $Z'_1$ | $C_1$ | $Z_2$ | $Z'_2$ | $C_2$ | $Z_3$ | $Z'_3$ | $C_3$ |
|----|-------|--------|-------|-------|--------|-------|-------|--------|-------|
| NR | $RP_{i+1}$ | 1 | 1 | $\Delta Q_i$ | $QP_{i+1}$ | $-2$ | $\Delta Q_i$ | $\Delta Q_i$ | $-1$ |

Determination of the contributions $\Delta Q_i$ for $d=2$

First embodiment

Figure 4:
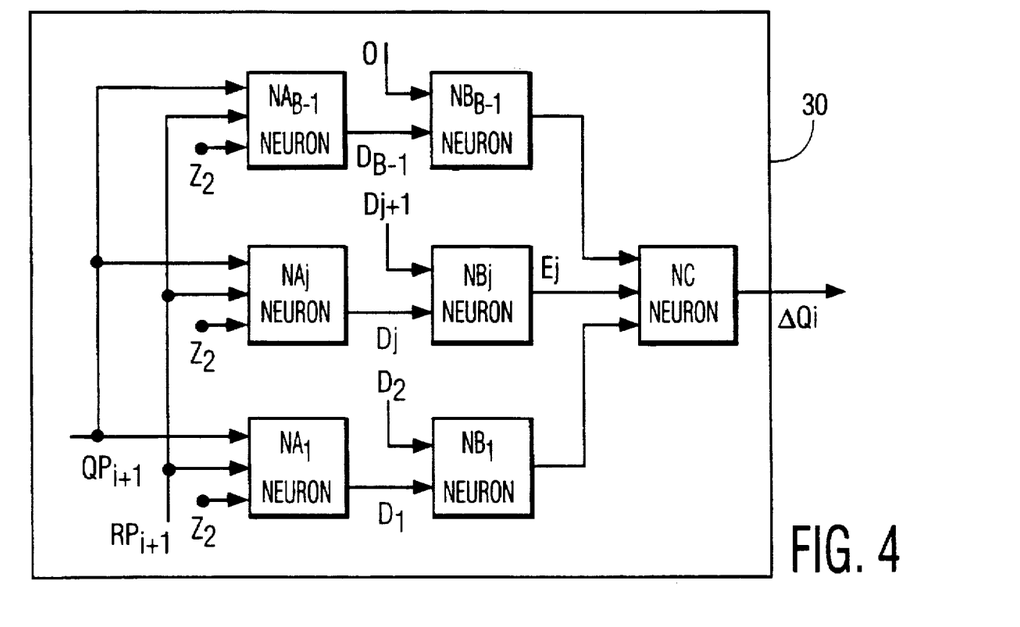
FIG. 4 shows a diagram of a first embodiment for a calculation of the contributions $\Delta Q_i$, utilizing a partial root QP and a partial remainder RP.

FIG. 4 shows a first embodiment of the means 30 for the first implementation. In the general case, the base on which the root Q is expressed has a dimension B. In accordance with the invention, preferably a layer of B-1 neurons $NA_j$ ($1 \leq j \leq B-1$) of the second type is used, comprising three parallel inputs, to determine, for i given, a number of B-1 terms $SD_j = RP_{i+1} - j.B^i(2.QP_{i+1} + j.B^i)$, where $1 \leq j \leq B-1$. A supplementary neuron is not necessary for the calculation of the term with $j=0$. The neurons $NA_j$ all receive $Z_1 = RP_{i+1}$, $Z_2$, and $Z_3 = QP_{i+1}$. They are trained so as to determine the quantities $SD_j$ whose values depend on the index j of the rank of the neuron in the layer. The terms $SD_j$ constitute the neural potentials POT of the neurons.

The neurons $NA_j$ must be trained for the calculation of the quantities $SD_j$. The determination of the term $j.B^i(2\ QP_{i+1} + j.B^i)$ may give rise to several combinations. The parameters $Z_1$, $C_1$, $Z_2$, $C_2$, $Z_3$, $C_3$ of the neurons $NA_j$ may be trained in conformity with the Table II which shows, by way of example, two combinations:

TABLE II

|        | $Z_1$ | $C_1$ | $Z_2$ | $C_2$ | $Z_3$ | $C_3$ |
|--------|-------|-------|-------|-------|-------|-------|
| $NA_j$ | $RP_{i+1}$ | 1 | 1 | $-j^2.B^{2i}$ | $QP_{i+1}$ | $-2j.B^i$ |
|        | $RP_{i+1}$ | 1 | $B^{2i}$ | $-j^2$ | $QP_{i+1}$ | $-2j.B^i$ |

All quantities $SD_j$ are tested so as to determine their sign and to derive therefrom the index $j=q_i$ of the smallest quantity $SD_j$ which is positive or zero. In order to carry out these tests, use is made of neurons $NA_j$ of the previously described second type, i.e. each neuron comprising a means for applying a non-linear function F to the neural potentials POT. This function F may be a function $F_1$ defined as:

$F_1(SD_j) = D_j = 1$ when $SD_j \geq 0$ $F_1(SD_j) = D_j = 0$ when $SD_j < 0$.

Thus, for $1 \leq j \leq q_i$ all outputs $D_j$ are 1 and for $q_i < j \leq B-1$ all outputs $D_j$ are 0.

A second layer of neurons $NB_j$ ($1 \leq j \leq B-1$) pair-wise compares the consecutive outputs $D_j$ and $D_{j+1}$. Thus, exclusively one neuron $NB_j$, having the rank $j=q_i$, has two different inputs $D_j$ and $D_{j+1}$ and has an output equal to $q_i$, the other neurons having an output zero. Therefore, the parameters $Z_1$, $C_1$, $Z_2$, $C_2$ of the neurons $NB_j$ are trained in conformity with the Table III (with $D_B=0$):

TABLE III

|        | $Z_1$ | $C_1$ | $Z_2$ | $C_2$ |
|--------|-------|-------|-------|-------|
| $NB_j$ | $D_j$ | 1 | $D_{j+1}$ | $-1$ |

In order to achieve that the outputs of the neurons $NB_j$ directly supply the index j of each neuron $NB_j$ in the layer (when $D_j \neq D_{j+1}$), use is made of neurons of the second type provided with means for applying a function $F_2$ with a response:

$E_j = 0$ when $e \leq 0$ $E_j = j$ when $e > 0$.

A third layer is formed by a multi-input neuron NC of the first type, each of the inputs being programmed in conformity with the Table IV:

TABLE IV

|    | $Z_j$ | $C_j$ |
|----|-------|-------|
| NC | $E_j$ | $B^j$ |

In an alternative version of this first embodiment, the coefficients $C_j$ of the neuron NC may be programmed to the value 1 in as far as the means for applying the non-linear function F of the neurons $NB_j$ operate with a function $F_3$ so that:

$E_j = 0$ when $e \leq 0$ $E_j = j.B^i$ when $e > 0$.

The Tables I to IV state different types of values:

fixed coefficients, for example 1, $-1$, which are loaded at the instant at which the neural processor is used for calculating the norm or the distance in conjunction with the dimension of the base B, values equal to X which depend on data used and which are loaded for each new data X, coefficients containing terms $B^i$ which are modified during each recurrent cycle. These coefficients, being multiples of $B^i$, are loaded at the start of each cycle, starting with the highest coefficients $B^i$. They are controlled by the host computer. The value of i is limited by a maximum value $i_{max}$ which determines the processing capacity of the neural processor on the relevant base B. A neural processor can be conceived to have a fixed architecture with a given base B (so a number of B-1 neurons $NA_j$, $NB_j$) with a predetermined value $i_{max}$. It is also possible for the user to choose the dimension of the base B and the value $i_{max}$ as a function of the hardware capacity of the neural processor, thus programming the coefficients. These choices are to be made in accordance with the values X used.

For example, in the case where X is an integer number so that $0 \leq X \leq 2^r-1$, for $i_{max}$ the smallest integer can be chosen so that into $\sqrt{2_{r-1}} \leq B^{(i_{max}+1)} -1, \ldots$ , where "int" represents the function of the integer part. Thus, $i_{max}$ does not depend on the data X.

Second embodiment

Figure 5:
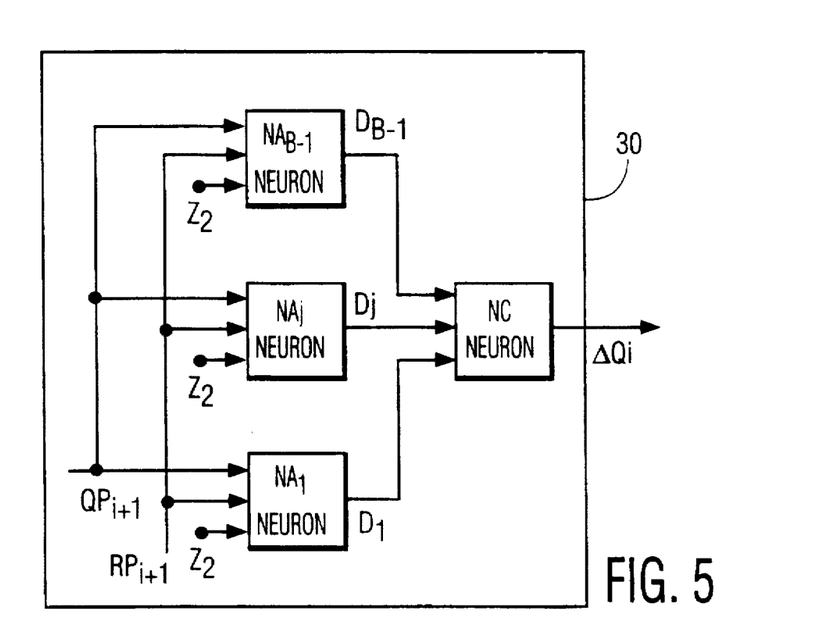
FIG. 5 shows a diagram of a second embodiment for a calculation of the contributions $\Delta Q_i$, utilizing a partial root QP and a partial remainder RP.

Still within the scope of the first implication, it may be useful in given cases to limit the number of neurons participating in the calculation for extracting the square root. FIG. 5 shows a situation where the layer of neurons $NB_j$ does not exist. The inputs of the neurons $NA_j$ receive data corresponding to the Table II and their non-linear function is still the function $F_1$. All outputs $D_j$ are applied to a neuron NC of the first type which is programmed in conformity with the Table IV by substituting $D_j$ for $E_j$. The neuron NC thus sums a number $q_i$ of contributions $B^i$ corresponding to the inputs $D_j=1$.

In a version of this second embodiment, the coefficients $C_j$ of the neuron NC may be programmed to the value 1 in as far as the means for applying the non-linear function F of the neurons $NA_j$ operate with a function $F_4$ so that:

$F_4(SD_j)=D_j=B^i$ when $SD_j \geq 0$ $F_4(SD_j)=D_j=0$ when $SD_j 21\ 0$.

Second implementation with d=2

Figure 6:
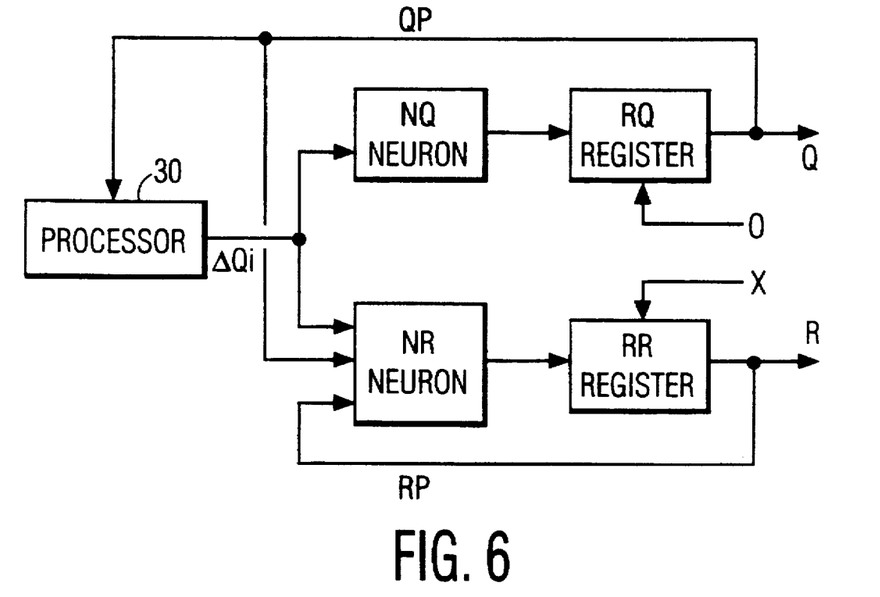
FIG. 6 shows a diagram of a second implementation of the calculation means for calculating a root Q and a remainder R by calculation of $\Delta Q_i$ on the basis of partial roots QP.

FIG. 6 shows diagrammatically a second implementation in the case d=2. As in the first implementation, there is provided a neuron NR which provides the final remainder at the end of the calculation. However, the block 30 now uses exclusively the partial quotient QP for calculating $\Delta Q_i$. An identical structure is then provided for each of the structures (FIGS. 4, 5) provided for the first implementation, except for the neurons $NA_j$ involved in the calculation of $\Delta Q_i$. Actually, the terms $SD_j$ calculated are different:

$SD_j=X-(QP_{i+1}+j.B^i)^2$.

For this calculation, use can be made of neurons $NA_j$ of the fourth type, comprising four inputs and provided with a non-linear function $F_1$, which neurons can be programmed, for example in conformity with the Table V:

TABLE V

| $Z_1$ | $Z'_1$ | $C_1$ | $Z_2$ | $Z'_2$ | $C_2$ | $Z_3$ | $Z'_3$ | $C_3$ | $Z_4$ | $Z'_4$ | $C_4$ |
|---|---|---|---|---|---|---|---|---|---|---|---|
| X | 1 | 1 | $QP_{i+1}$ | $QP_{i+1}$ | −1 | $QP_{i+1}$ | $B^i$ | −2j | $B^i$ | $B^i$ | $-j^2$ |

The number of inputs of the neurons can be reduced by changing the programming and the structure, for example by replacing each neuron $NA_j$ by several cascade-connected neurons.

For the determination of $\Delta Q_i$, use is preferably made of a structure deduced from the second embodiment (FIG. 5) given for the first implementation.

It is possible to use neurons $NA_j$ having a non-linear function $F_4$ by modifying the coefficients of other neurons.

Third implementation with d=2 (first group)

A third application corresponds to the case where it is not desired to determine the remainder R. In that case the neuron NR and the register RR of FIG. 6 are omitted. The only result is the final root. The importance of this third implementation consists in that the calculation of RP may be ignored if RP is not used.

The diagrams corresponding to a first group of this third implementation are identical to those described for the second implementation (FIG. 6), except that they do not contain the neuron NR and the register RR.

For the determination of $\Delta Q_i$, use is preferably made of a structure analogous to that shown in FIG. 5 and derived therefrom, for its application in the second implementation.

Third implementation with d=2 (second group)

Still within the scope of the third implementation, it is possible to derive versions therefrom by merging the neuron NC (means 30) with the neuron NQ. This is obtained by:

omitting the neuron NC which previously received inputs $V_j$, equal to $E_j$ or $D_j$, depending on the embodiment, and which had coefficients $C_j$ all equal either to 1 or to $B^i$, depending on the relevant case, subsequently replacing the neuron NQ by a neuron of the first type, comprising B inputs programmed in conformity with the Table VI in which $V_j$ and $C_j$ correspond to the previous neuron NC:

TABLE VI

|    | $Z_1$ | $C_1$ | $Z_2$ to $Z_B$ | $C_2$ to $C_B$ |
|---|---|---|---|---|
| NA | $QP_{i+1}$ | 1 | $V_j$ | $C_j$ |

The advantage of this version resides in the fact that the structure comprises one layer less than before.

Specific implementation for B=2 with d=2

Figure 7:
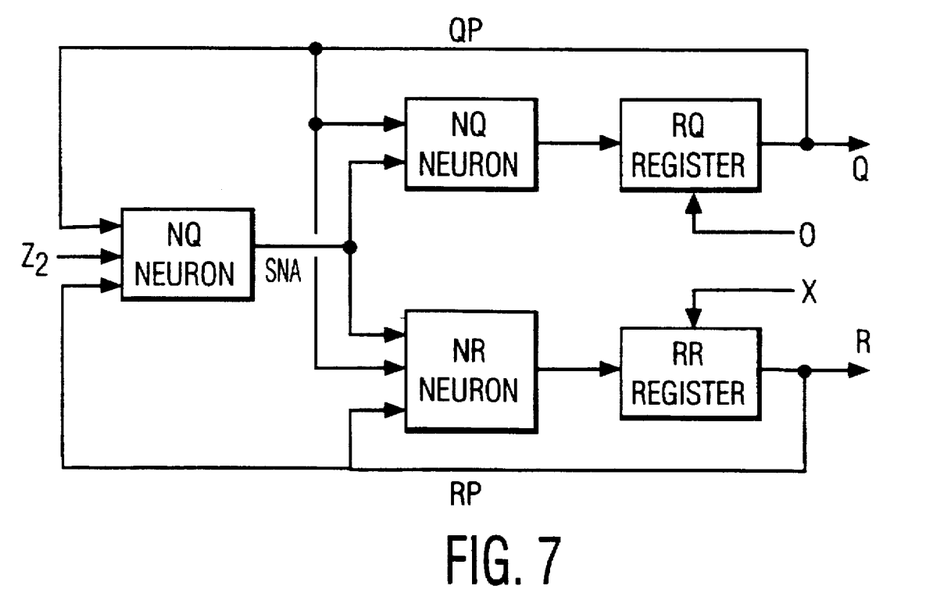
FIG. 7 shows a diagram of an implementation with three neurons for a calculation of a root Q and a remainder R used specifically for B=2 and d=2.

A case which is interesting because of the simplicity of the hardware means used is the case where the base B has a dimension 2. In this case, the determination of the contributions qi.$B^i$ requires only a single neuron. FIG. 7 shows an embodiment which utilizes determination of partial roots QP and partial remainders RP. Three neurons NA, NR, NQ suffice to determine the root Q and the remainder R. The neurons NQ (first type) and NR (first or third type) are followed by storage registers RQ and RR, respectively. The parameters Z, C of the neuron NA (second type) are programmed in conformity with the Table II, where j=1. The non-linear function F applied to the data supplied by the summing device of NA may be applied as before in conformity with the functions $F_1$ or $F_4$. In the case of the function $F_4$, the parameters Z, C of the neurons NQ and NR may be programmed in conformity with the Tables IA, IB, IC by replacing $\Delta Q_i$ by SNA which is then equal to $\Delta Q_i$. In the case of the function $F_1$, the parameters Z, C of the neuron NQ may be programmed in conformity with the Table VIIA, SNA being equal to $q_i$.

TABLE VIIA

|    | $Z_1$      | $C_1$ | $Z_2$ | $C_2$ |
|----|------------|-------|-------|-------|
| NQ | $QP_{i+1}$ | 1     | SNA   | $2^i$ |

For the neuron NR use can be made of:

either the neuron of the first type with a third input $Z_3$ and a third coefficient $C_3$, which neuron is programmed in conformity with Table VIIB (FIG. 7):

TABLE VIIB

|    | $Z_1$      | $C_1$ | $Z_2$      | $C_2$           | $Z_3$ | $C_3$       |
|----|------------|-------|------------|-----------------|-------|-------------|
| NR | $RP_{i+1}$ | 1     | SNA        | $-2^{i+1}QP_{i+1}$ | SNA   | $-2^i.SNA$  |
|    | $RP_{i+1}$ | 1     | $QP_{i+1}$ | $-2^{i+1}SNA$   | SNA   | $-2^{2i}.SNA$ | or a neuron of the third type (comprising 3 inputs) which is programmed in conformity with the Table VIIC:

TABLE VIIC

|    | $Z_1$      | $Z'_1$ | $C_1$ | $Z_2$ | $Z'_2$     | $C_2$      | $Z_3$ | $Z'_3$ | $C_3$      |
|----|------------|--------|-------|-------|------------|------------|-------|--------|------------|
| NR | $RP_{i+1}$ | 1      | 1     | SNA   | $QP_{i+1}$ | $-2^{i+1}$ | SNA   | SNA    | $-2^{2i}$  |

Figure 8:
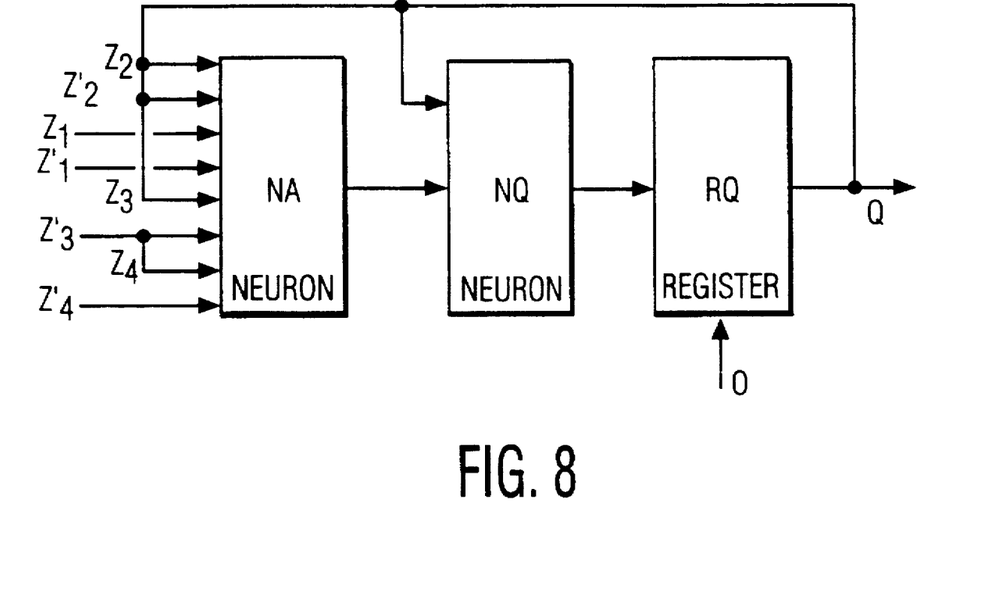
FIG. 8 shows a diagram of an implementation with two neurons for a calculation of a root Q, used specifically for B=2 and d=2.

Still operating with a base of 2, it is also possible, in conformity with the diagram of FIG. 8, to reduce the complexity of the hardware means to two neurons. In that case no partial remainders are determined. The parameters of the neuron NA are the same as shown in Table V with $j=1$. The application means may also implement the already described functions $F_1$ or $F_4$. In the case of the function $F_4$, the parameters Z and C of the neuron NQ may be programmed in conformity with the Table IA by replacing $\Delta Q_i$ by SNA $(=\Delta Q_i)$. In the case of the function $F_1$, the parameters Z and C of the neuron NQ may be programmed in conformity with the Table VIIA, with SNA=$q_i$.

Implementation with arbitrary d

For d arbitrary, the implementations previously described for $d=2$ can be generalized. It suffices to replace each neuron $NA_j$ by a group of several neurons of the third type which are connected in cascade, enabling overall calculation of products of degree d. In this case only the last neuron of each group of neurons $NA_j$ has a non-linear function. A group of neurons $NA_j$ calculates a quantity:

$$SD_j = X - (QP_{i+1} + j.B^i)^d$$

or $$SD_j = RP_{i+1} + (QP_{i+1})^d - (QP_{i+1} + j.B^i)^d,$$

depending on the implementation.

The quantities $SD_j$ are subsequently transformed into $D_j$ by the non-linear functions.

In the implementations where the partial remainder RP is calculated, the neuron NR is also replaced by a group of cascade-connected neurons of the third type. The partial remainder is then updated in conformity with:

$$RP_i = RP_{i+1} + (QP_{i+1})^d - (QP_{i+1} + \Delta Q_i)^d$$

or $$RP_i = RP_{i+1} + (QP_i - \Delta Q_i)^d - (\Delta P_i)^d,$$

depending on the implementation.

Case where $B=2^k$

Figure 9:
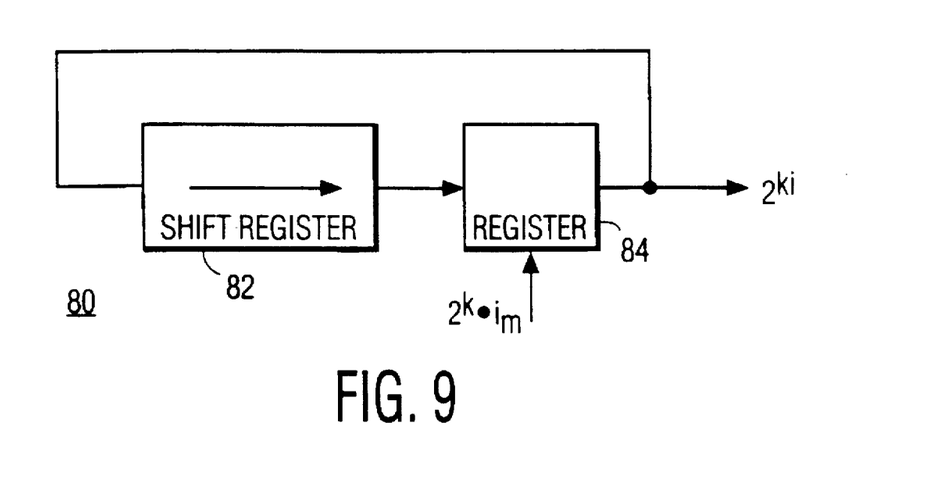
FIG. 9 shows a diagram of a unit for calculating terms of the type $2^{ki}$ in the case where the base B has a dimension of the type $2^k$.

When the dimension of the base can be written as $B=2^k$, where k is an integer, use can be made of a unit which iteratively calculates given values involving values $B^i$. This is the case, for example for the values $\pm j.B^i$. FIG. 9 shows such a module 80 which comprises a k-position shift register 82 which is followed by a register 84 which can be initialized by an initialization value $2^{k.imax}$. The output of the register 84 supplies coefficients $B^i=2^{k.i}$ which are also applied to the input of the shift register 82. By shifting the input data through each time k positions, division by a factor $2^k$ is possible, so that the successive coefficients $B^i$ are all calculated in order to implement the described methods. This module 80 can be used for determining the parameters Z and/or C.

Overflows

The neural processor must store different parameters Z, C, different input data X, and results QP, RP. To this end, the neural processor has a processing capacity which depends on the maximum capacities of registers and memories.

Generally speaking, if the capacity of the neuron state registers and the synaptic coefficient memories allows for the storage of signed words of (r+1) bits, it is possible to process, for example data X so that $0 \leq X \leq 2^r - 1$, where X is an integer. Nevertheless, when the synaptic coefficients are to be stored in the form $j.B^i$, the storage capacities in number of bits per data and/or coefficient are to be considered. Those skilled in the art will then choose one of the programming modes given, for example in the Tables II or V, as a function of the length of the registers and memories available in the neural processor.

The invention may be used for the processing of data X represented by integer or fractional numbers.

The various implementations derive their importance from the effective use of the processor. Actually, depending on the version considered:

the number of neurons is larger or smaller,

"supplementary" inputs Z, for example equal to $B^i$ or to a multiple of this value, are required or not, the synaptic coefficients are fixed or variable in the course of one or several root extractions, the transfer functions of the comparators are fixed or variable in the course of a root extraction, external or internal operational variables appear as neuron states or as synaptic coefficients and if the respective registers do not have the same length, the maximum acceptable values for these variables are higher or lower, which means that the overflow problems must be dealt with in different ways.

I claim:

1. A neural processor, comprising calculation apparatus (11–15) for extracting a root Q of a data X, which root constitutes either a norm of data or a distance between data, wherein the calculation apparatus comprises a preliminary neuron device (30) having
an output;
at least one plurality of (B-1) neurons arranged in parallel for computing terms $q_i \times B^i$ expressing a serial development of the root Q in an arithmetic base B, where B, q, and i are integers;

a two-input first neuron (NQ), having a first input coupled to the output of the preliminary neuron device;

a three-input second neuron, having a first input coupled to the output of the preliminary neuron device;

first delay means (RQ) for delaying a signal on an output of the first neuron, the first delay means having an output for providing, ultimately, the root Q, the output of the first delay means being recursively coupled to a second input of the first neuron, a first input of the preliminary neuron device, and to a second input of the second neuron; and second delay means (RR) for delaying a signal on an output of the second neuron and having a first input coupled with the output of the second neuron;

an output for providing, ultimately, a remainder R, the output of the second delay means being recursively coupled to a third input of the second neuron and to a second input of the preliminary neuron device; and a second input for initializing the second delay means with the data X.

2. A neural processor, comprising calculation apparatus (11–15) for extracting a root Q of a data X, which root constitutes wither a norm of data or a distance between data, wherein the calculation apparatus comprises a preliminary neuron device (30) comprising:
a first input;
a second input for receiving the data X; and
at least one plurality of (B-1) neurons arranged in parallel for computing terms $q_i \times B^i$ expressing a serial development of the root Q in an arithmetic base B, where B, q, and i are integers;

a two-input first neuron (NQ) having a first input coupled with an output of the preliminary neuron device;

a three-input second neuron (NR), having a first input coupled with the output of the preliminary neuron device;

first delay means (RQ) for delaying a signal on an output of the first neuron, the first delay means having an output for providing, ultimately, the root Q, the output of the first delay means being recursively connected to a second input of the first neuron, a first input of the preliminary neuron device, and a second input of the second neuron;

second delay means (RR) for delaying a signal on an output of the second neuron and having a first input coupled to an output of the second neuron;

an output for providing, ultimately, a remainder R, the output of the second delay means being recursively connected to a third input of the second neuron; and a second input for initializing the second delay means with the data X.

3. A neural processor, comprising calculation apparatus (11–15) for extracting a root Q of a data X, which root constitutes either a norm of data or a distance between data, wherein the calculation apparatus comprises a preliminary neuron device (30) having
a first input;
a second input for receiving the data X; and
at least one plurality of (B-1) neurons arranged in parallel for computing terms $q_i \times B^i$ expressing a serial development of the root Q in an arithmetic base B, where B, q, and i are integers;

a two-input first neuron (NQ) having a first input coupled to an output of the preliminary neuron device; and first delay means for delaying a signal at an output of the first neuron, the first delay means having an output for providing, ultimately, the root Q, the output of the first delay means being connected recursively to a second input of the first neuron and the first input of the preliminary neuron device.

* * * * *